US011838468B2

(12) United States Patent
Ooki

(10) Patent No.: US 11,838,468 B2
(45) Date of Patent: Dec. 5, 2023

(54) IMAGE READING APPARATUS AND IMAGE FORMING APPARATUS

(71) Applicant: CANON KABUSHIKI KAISHA, Tokyo (JP)

(72) Inventor: Kenji Ooki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/173,850

(22) Filed: Feb. 24, 2023

(65) Prior Publication Data
US 2023/0291852 A1 Sep. 14, 2023

(30) Foreign Application Priority Data
Mar. 8, 2022 (JP) ................... 2022-035263

(51) Int. Cl.
*H04N 1/00* (2006.01)
*G03G 15/22* (2006.01)

(52) U.S. Cl.
CPC ....... *H04N 1/00801* (2013.01); *G03G 15/221* (2013.01); *H04N 1/0062* (2013.01); *H04N 1/0066* (2013.01); *H04N 1/0071* (2013.01); *H04N 1/00572* (2013.01); *H04N 1/00602* (2013.01); *H04N 1/00615* (2013.01); *H04N 1/00631* (2013.01); *H04N 1/00689* (2013.01); *H04N 1/00745* (2013.01); *H04N 1/00793* (2013.01); *H04N 1/00824* (2013.01)

(58) Field of Classification Search
None
See application file for complete search history.

(56) References Cited

U.S. PATENT DOCUMENTS

| | | | | |
|---|---|---|---|---|
| 5,642,200 A | * | 6/1997 | Kurihara | H04N 1/32486 399/83 |
| 6,438,350 B1 | * | 8/2002 | Hasegawa | H04N 1/00572 399/374 |
| 2010/0142009 A1 | * | 6/2010 | Tsukahara | H04N 1/4076 358/475 |
| 2013/0119602 A1 | * | 5/2013 | Hanamoto | B65H 3/34 271/117 |

FOREIGN PATENT DOCUMENTS

JP 2011011840 A 1/2011

* cited by examiner

*Primary Examiner* — Helen Zong
(74) *Attorney, Agent, or Firm* — ROSSI, KIMMS & McDOWELL LLP

(57) ABSTRACT

An image reading apparatus includes a stacking tray, a feeding roller, a restricting member configured to move to a restricting position and a retracted position, a reading sensor, a reversing roller configured to perform a reversing operation, a first conveyance path, a second conveyance, and a controller. The controller is configured to permit the reversing operation if the controller receives an execution instruction of a double-sided reading job on a sheet having a first size, and prohibit the reversing operation if the controller receives an execution instruction of the double-sided reading job on a sheet having a second size smaller than the first size.

14 Claims, 10 Drawing Sheets

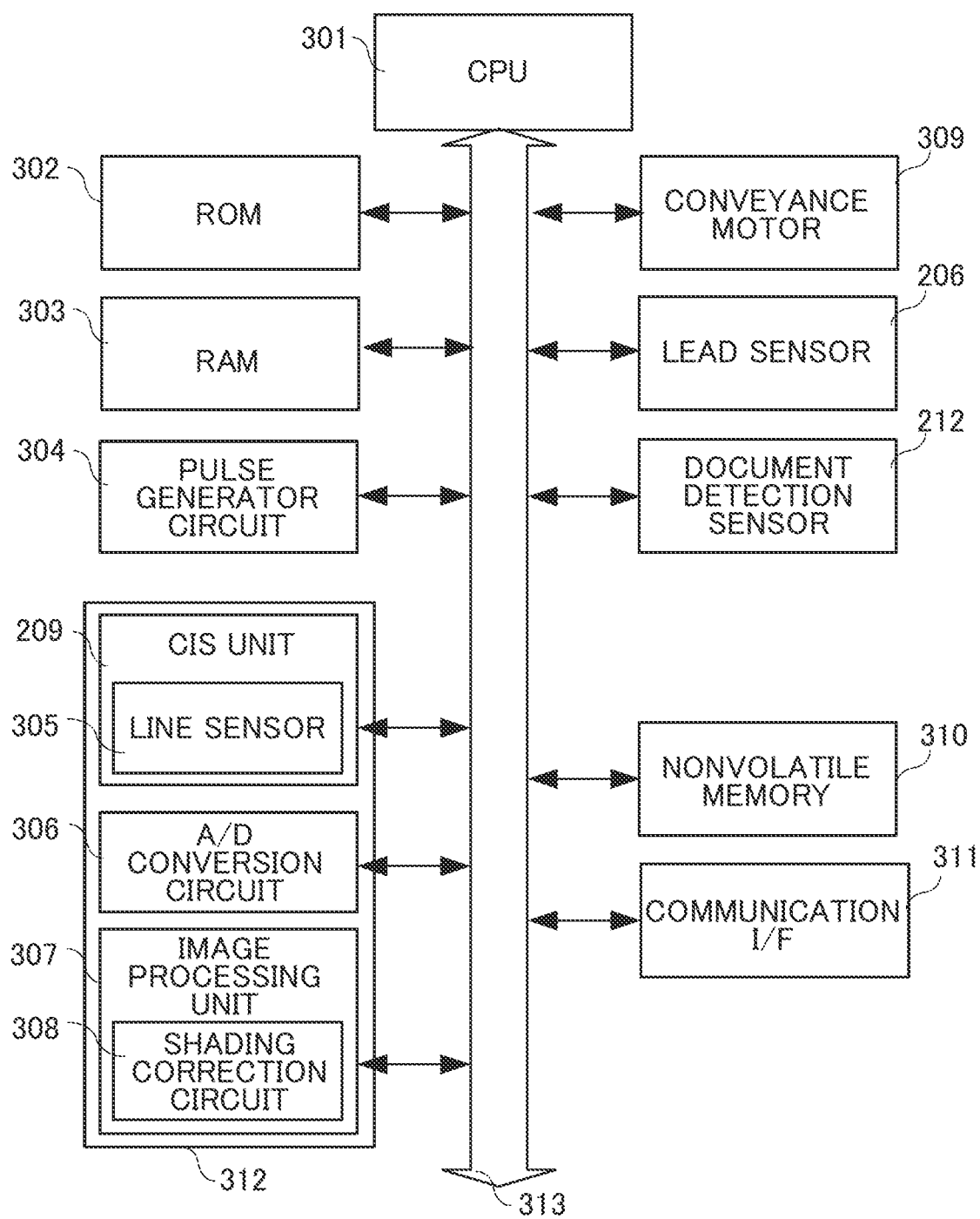

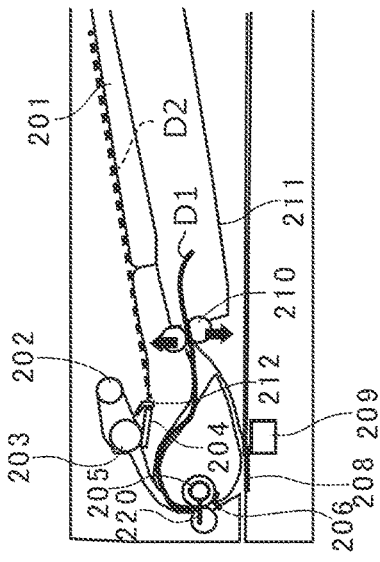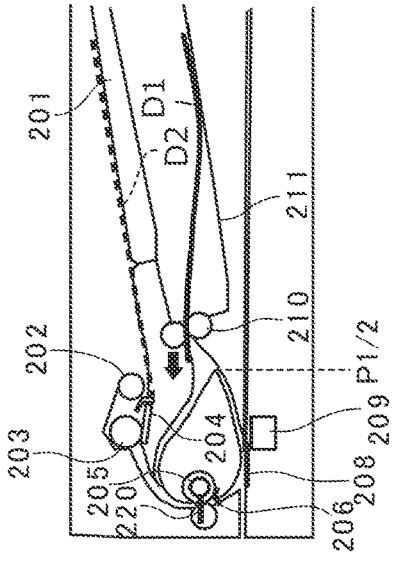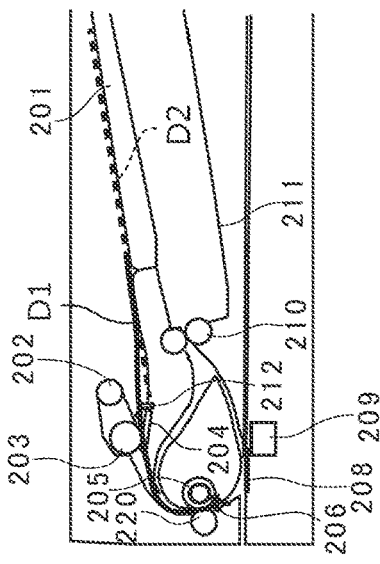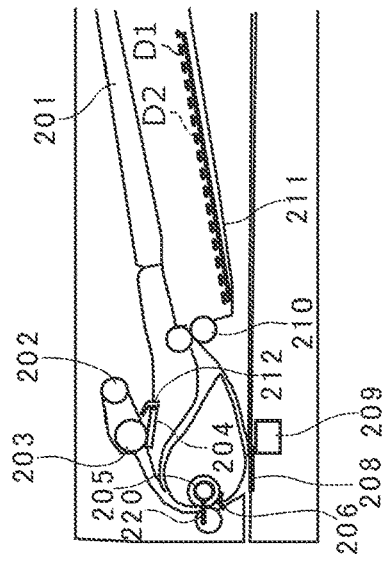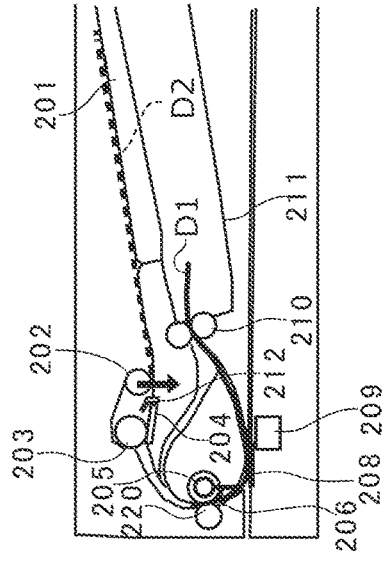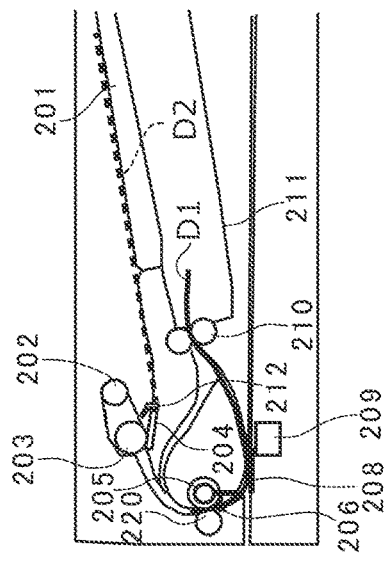

IMAGE READING APPARATUS AND IMAGE FORMING APPARATUS

BACKGROUND OF THE INVENTION

Field of the Invention

The present disclosure relates to an image reading apparatus that reads an image from a sheet, and an image forming apparatus that forms an image on a recording material.

Description of the Related Art

JP 2011-011840 A describes that a sheet conveyance apparatus (auto document feeder (ADF)) that conveys a document by sheet in an image reading apparatus, the auto document feeder provided with a restricting member that comes into contact with a leading edge of the document to correct skew of the document. The restricting member is urged by an urging spring, and the restricting member is moved so as to permit the document to pass when the force by which the leading edge of the document presses the restricting member overcomes the urging force of the urging spring.

As in JP 2011-011840 A, in a sheet conveyance apparatus configured to execute an operation of reversing a sheet that has once passed through a restricting member and causing the sheet to pass through again the restricting member, when the sheet comes into contact with the restricting member for the second time, conveyance failure may occur if the restricting member cannot be moved.

SUMMARY OF THE INVENTION

The present disclosure provides an image reading apparatus and an image forming apparatus that can reduce possibility of occurrence of conveyance failure.

According to one aspect of the invention, an image reading apparatus includes a stacking tray on which a sheet is stacked, a feeding roller configured to feed the sheet stacked on the stacking tray, a restricting member configured to move to a restricting position where the restricting member restricts passage of the sheet and a retracted position where the restricting member is retracted to permit passage of the sheet, the restricting member being configured to correct skew of the sheet by coming into contact with a leading edge of the sheet fed by the feeding roller at the restricting position, and to move from the restricting position to the retracted position by being pressed by the sheet, a reading sensor configured to read, at a reading position, an image of the sheet that has passed through the restricting member, a reversing roller configured to perform a reversing operation of conveying, in a first direction, the sheet that has passed through the reading position, and then conveying the sheet in a second direction opposite to the first direction, a first conveyance path through which the sheet is conveyed from the feeding roller to the reversing roller via the restricting member and the reading position, a second conveyance path through which the sheet reversed by the reversing roller is conveyed from the reversing roller toward the restricting member, and a controller configured to execute a double-sided reading job of conveying the sheet to the reading position via the first conveyance path to read an image of a first side of the sheet, and conveying the sheet again to the reading position via the second conveyance path by the reversing operation to read an image of a second side opposite to the first side of the sheet, wherein the controller is configured to permit the reversing operation if the controller receives an execution instruction of the double-sided reading job on a sheet having a first size, and prohibit the reversing operation if the controller receives an execution instruction of the double-sided reading job on a sheet having a second size smaller than the first size.

According to another aspect of the invention, an image forming apparatus includes a stacking tray on which a sheet is stacked, a feeding roller configured to feed the sheet stacked on the stacking tray, a restricting member configured to move to a restricting position where the restricting member restricts passage of the sheet and a retracted position where the restricting member is retracted to permit passage of the sheet, the restricting member being configured to correct skew of the sheet by coming into contact with a leading edge of the sheet fed by the feeding roller at the restricting position, and to move from the restricting position to the retracted position by being pressed by the sheet, a reading sensor configured to read, at a reading position, an image of the sheet that has passed through the restricting member, a reversing roller configured to perform a reversing operation of conveying, in a first direction, the sheet that has passed through the reading position, and then conveying the sheet in a second direction opposite to the first direction, a first conveyance path through which the sheet is conveyed from the feeding roller to the reversing roller via the restricting member and the reading position, a second conveyance path through which the sheet reversed by the reversing roller is conveyed from the reversing roller toward the restricting member, a controller configured to execute a double-sided reading job of conveying the sheet to the reading position via the first conveyance path to read an image of a first side of the sheet, and conveying the sheet again to the reading position via the second conveyance path by the reversing operation to read an image of a second side opposite to the first side of the sheet, and an image forming portion configured to form an image on a recording material based on image information read by the image reading apparatus, wherein the controller is configured to permit the reversing operation if the controller receives an execution instruction of the double-sided reading job on a sheet having a first size, and prohibit the reversing operation if the controller receives an execution instruction of the double-sided reading job on a sheet having a second size smaller than the first size.

Further features of the present invention will become apparent from the following description of exemplary embodiments with reference to the attached drawings.

BRIEF DESCRIPTION OF THE DRAWINGS

FIG. 3 is a block diagram showing a system configuration of the image reading apparatus according to the example.

FIGS. 10A to 10F are views showing a double-sided reading operation by the image reading apparatus according to the example.

DESCRIPTION OF THE EMBODIMENTS

Hereinafter, embodiments according to the present disclosure will be described with reference to the drawings.

Image Forming Apparatus

Figure 1:
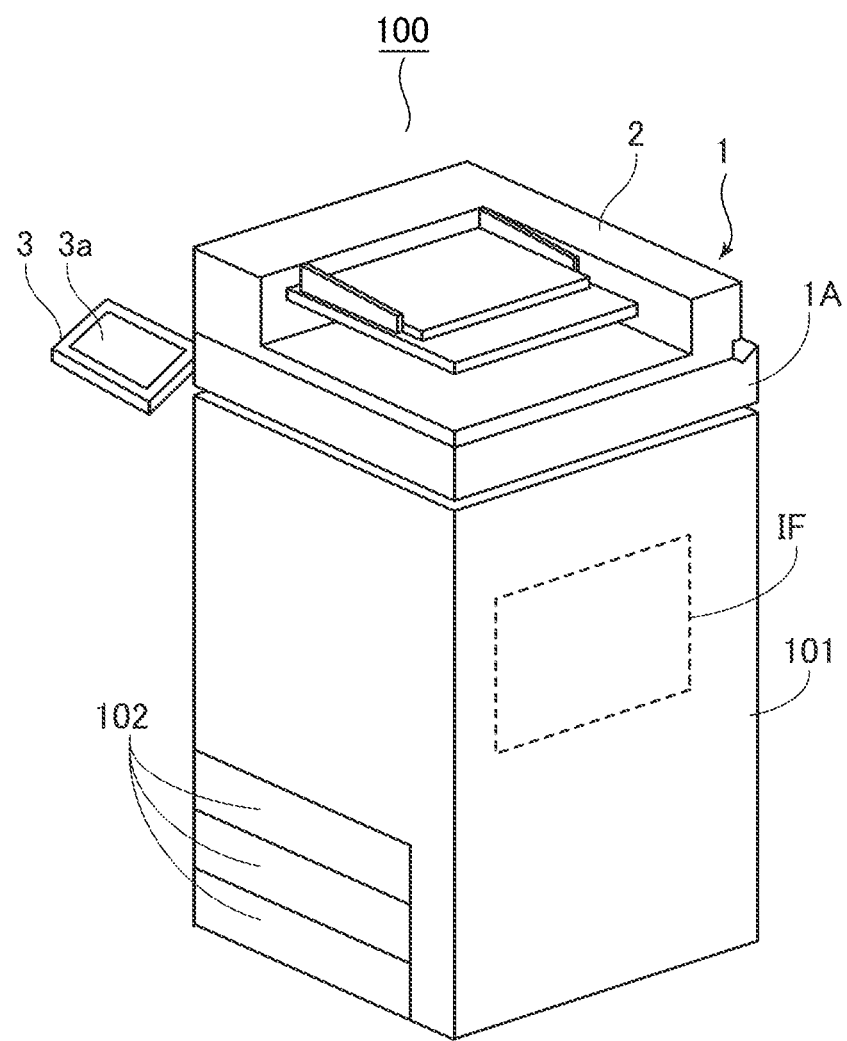
FIG. 1 is a perspective view of an image forming apparatus according to an example.

FIG. 1 is a view showing an image forming apparatus 100 according to one example. The image forming apparatus 100 includes an image forming apparatus body 101 having an image forming unit IF, and an image reading apparatus 1 provided on an upper part of the image forming apparatus body 101. The image forming apparatus 100 forms an image onto a recording material on the basis of image information read by the image reading apparatus 1 or image information received from an external apparatus such as a personal computer. As the recording material, a sheet fed from a cassette 102 removably provided in a lower part of the image forming apparatus body 101 or a manual feed tray provided on a side part of the image forming apparatus body 101 is used. The image forming apparatus 100 may transmit image information read by the image reading apparatus 1 to an external apparatus. The image forming apparatus 100 of the present example is a copying machine, but may be a scanner, a facsimile, or a multifunctional peripheral (MFP) in which these functions are integrated.

The image forming apparatus 100 includes an operation unit 3 as a user interface. The operation unit 3 has a screen 3a of a liquid crystal panel as a display portion that displays visual information and audio information to the user, and a touchscreen function as an input portion that receives input operations of inputting instructions or information to the image forming apparatus 100. The operation unit 3 also functions as a display portion and an input portion related to the function of the image reading apparatus 1. Therefore, it is also deemed that the operation unit 3 constitutes the image reading apparatus 1 together with the constituent elements of the image reading apparatus 1 described below. Input and output of information to and from the image forming apparatus 100 can be performed with an external apparatus.

The image forming unit IF is, for example, a direct transfer type electrophotographic mechanism. In this case, the image forming unit IF includes a photosensitive drum as an image bearing member, a charging unit, an exposing unit, a developing unit, a transfer unit, and a cleaning unit that act on the photosensitive drum, and a fixing unit that fixes an image onto a recording material. In the image forming operation, the charging unit uniformly charges the surface of the photosensitive drum, the exposing unit exposes the photosensitive drum on the basis of image information, and writes an electrostatic latent image onto the surface of the photosensitive drum. The developing unit develops the electrostatic latent image with developer agent containing charged toner, and visualizes the electrostatic latent image as a toner image. The transfer unit transfers the toner image borne on the photosensitive drum to the recording material fed from the cassette 102 or the manual feed tray. As the fixing unit, for example, a heat fixing type fixing unit including a roller pair that nips and conveys the recording material and a heating portion such as a halogen lamp that heats the toner image on the recording material is used. The recording material that has passed through the fixing unit is discharged to the outside of the image forming apparatus body 101 as a product.

The image forming unit IF is an example of an image forming portion or image forming means. Instead of the direct transfer type electrophotographic mechanism, an intermediate transfer type electrophotographic mechanism that transfers a toner image formed on an image bearing member to a recording material via an intermediate transfer member such as an intermediate transfer belt may be used as the image forming portion or image forming means. In addition, not limited to the electrophotographic mechanism, for example, an inkjet type image forming portion or an offset printing mechanism may be used as the image forming portion or image forming means. The image forming apparatus is configured to use, as a recording material or a document, various sheets having different sizes and materials, including paper such as plain paper and thick paper, a sheet material subjected to surface treatment such as coated paper, a plastic film, cloth, and a sheet material having a special shape such as an envelope or index paper.

Image Reading Apparatus

The image reading apparatus 1 will be described. The image reading apparatus 1 of the present example includes a body unit 1A attached to the upper part of the image forming apparatus body 101, and an ADF 2 supported on the body unit 1A via a hinge so as to be openable and closable. The ADF 2 is a sheet conveyance apparatus of the present example. The image reading apparatus 1 is configured to read image information from a document being conveyed by the ADF 2 or a stationary document placed on the body unit 1A.

An image reading apparatus having the configuration described below can also be used as an apparatus independent of the image forming apparatus.

Figure 2:
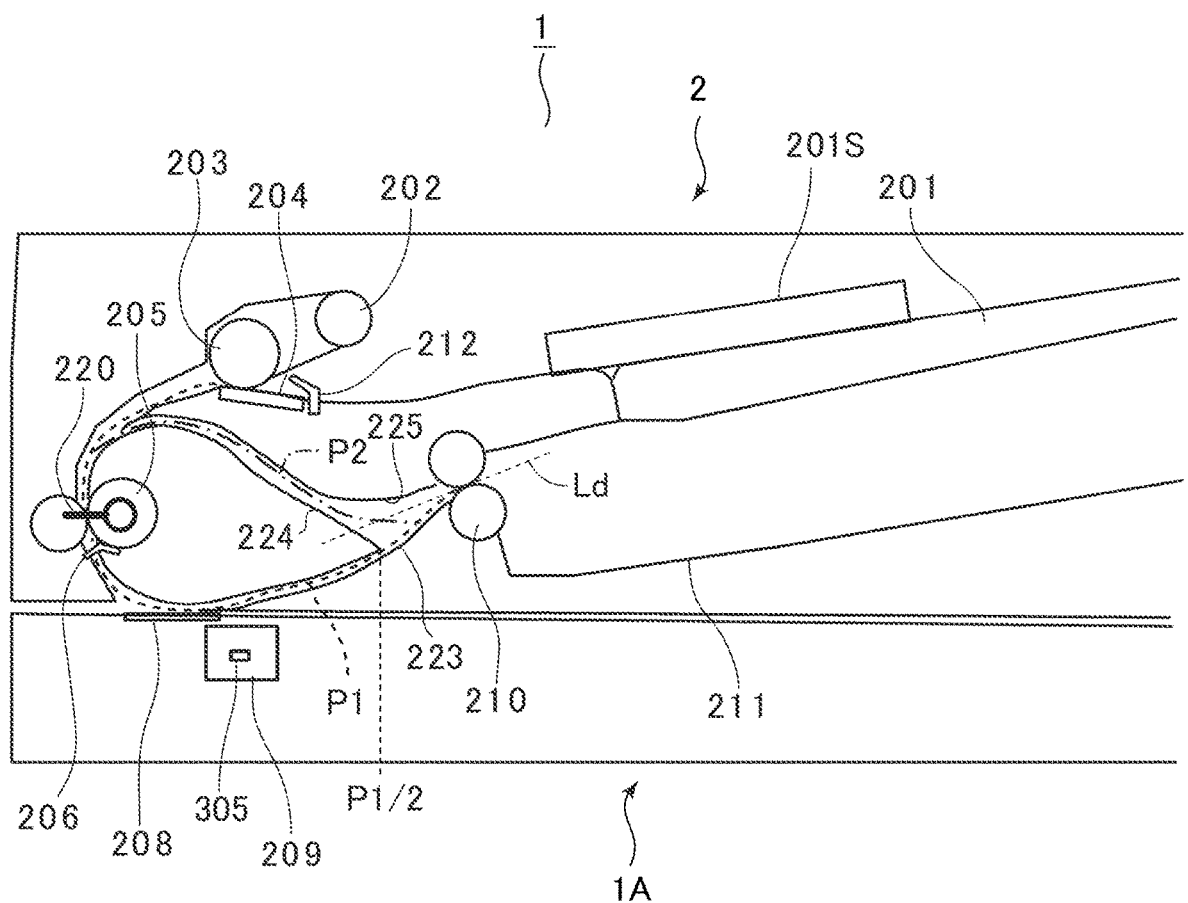
FIG. 2 is a schematic diagram of an image reading apparatus according to the example.

FIG. 2 is a schematic diagram showing a cross-sectional configuration of the image reading apparatus 1. The body unit 1A of the image reading apparatus 1 includes a contact image sensor (CIS) unit 209 as a reading sensor and a skimming glass 208 (contact glass or flow-reading glass). The ADF 2 includes a document tray 201, a pickup roller 202, a separation roller 203, a separation pad 204, a lead roller pair 205, a shutter member 220, a lead sensor 206, a discharge reversing roller pair 210, and a discharge tray 211.

In the following description, a direction along a moving direction of a document to be discharged to the discharge tray 211 via inside the ADF 2 from the document tray 201 is defined as a sheet conveyance direction. A direction orthogonal to the sheet conveyance direction (rotation axis direction of the lead roller pair 205) is defined as a sheet width direction. The sheet width direction is a main scanning direction when the reading sensor reads image information from the document, and the sheet conveyance direction is a sub-scanning direction.

The CIS unit 209 includes a light emitting element and a light guide member that irradiate a document with light, a line sensor 305 as a light receiving element, and an equal magnification optical system such as a lens array that forms an image of reflected light from the document onto a light receiving surface of the line sensor 305. The CIS unit 209 optically scans the reading surface of the document being conveyed by the ADF 2 via the skimming glass 208 as a transparent member, and converts an optical image into an electric signal by the line sensor 305, thereby acquiring image information. Instead of the CIS unit, a CCD unit including a charged coupled device (CCD) as a light receiving element and a reduction optical system may be used as a reading sensor.

The document tray 201 is a stacking tray on which a document that is a reading target sheet is stacked or placed. The document tray 201 is provided with a document detection sensor 212 that detects the presence or absence of a document on the document tray 201. The document tray 201 is provided with a side edge regulation member 201S that regulates an edge position in the sheet width direction of the document placed on the document tray 201. The side edge regulation member 201S includes a pair of regulation plates configured to relatively move in the sheet width direction. By moving symmetrically with respect to the center position in the sheet width direction of the pickup roller 202, the side edge regulation member 201S is allowed to move to a position corresponding to the dimensions of the document (hereinafter, also simply referred to as "width of document" or "document width") in the sheet width direction.

The pickup roller 202 (feeding roller) is a feeding portion that feeds a document from the document tray 201. The separation roller 203 (separation conveyance roller) is a conveyance member that further conveys the document fed by the pickup roller 202. The separation pad 204 is a separation member that is disposed in contact with the separation roller 203 and separates the document at a separation nip formed between the separation pad 204 and the separation roller 203. That is, when a plurality of documents enter the separation nip, the separation pad 204 applies a frictional force to the lower documents other than the uppermost document in contact with the separation roller 203, and prevents the lower documents from passing through the separation nip. Instead of the separation pad 204, a roller member that comes into contact with the separation roller 203 may be used as the separation member. In that case, the roller member may be supported by a shaft fixed to a frame body of the ADF 2 via a torque limiter, or may be supported by a shaft to which a driving force in a direction opposite to the sheet conveyance direction is input via a torque limiter.

The lead roller pair 205 is a roller pair that conveys, toward the skimming glass 208 which is on a reading position, the document conveyed from the separation roller 203. The shutter member 220 is a restricting member that corrects skew of the document upstream of the lead roller pair 205. The shutter member 220 will be described below. The lead sensor 206 is a detection sensor that detects the document at a detection position on a conveyance route (first conveyance path) of the document from the pickup roller 202 toward the discharge reversing roller pair 210. As the lead sensor 206, it is possible to use a configuration in which a flag that swings when brought into contact with the document and a photoelectric sensor (photo interrupter) that detects rotation of the flag are combined. Not limited to this, for example, a photoelectric sensor that emits light toward the conveyance path and detects reflected light from the document may be used as the lead sensor 206.

The discharge reversing roller pair 210 is a discharge roller that discharges the document from which image information has been read. The discharge reversing roller pair 210 of the present example also serves as a reversing roller that reversely conveys the document in the double-sided reading operation. The reversing roller may be provided separately from the discharge roller. The discharge tray 211 is a discharge portion on which the discharged document is stacked.

The ADF 2 includes a main conveyance path P1 (first conveyance path) and a reverse conveyance path P2 (second conveyance path) as conveyance paths for the document. The main conveyance path P1 is a conveyance route (conveyance space) from the separation nip to the discharge reversing roller pair 210 via the lead roller pair 205 and the skimming glass 208. The reverse conveyance path P2 is a conveyance route (conveyance space) branching from the main conveyance path P1 between the skimming glass 208 and the discharge reversing roller pair 210 and joining the main conveyance path P1 between the separation nip and the lead roller pair 205. The main conveyance path P1 and the reverse conveyance path P2 are formed by a guide member supported by the frame body of the ADF 2 and the skimming glass 208.

A basic flow of the skimming operation or flow-reading operation will be described. The user places a reading target document onto the document tray 201. When the user gives an instruction to start reading with the operation unit 3, the conveyance motor in the ADF 2 is activated, the pickup roller 202 is lowered while rotating, and the uppermost document (uppermost sheet) is fed from the document tray 201. The document fed by the pickup roller 202 is conveyed toward the lead roller pair 205 while being separated sheet by sheet by the separation roller 203 and the separation pad 204. Before the document enters the nip portion of the lead roller pair 205, the skew of the document is corrected by the shutter member 220 described below.

The lead roller pair 205 conveys the received document toward the skimming glass 208. At this time, an image leading signal described below is generated on the basis of the timing at which the lead sensor 206 detects the leading edge of the document sent out from the lead roller pair 205. In the present example, the dimensions of the document (hereinafter, also simply referred to as "length of document" or "document length") in the sheet conveyance direction are acquired on the basis of the elapsed time from when the lead sensor 206 detects the leading edge of the document to when the lead sensor 206 detects the trailing edge of the document. The length of the document is used for determination of the document size. Here, in order to acquire the length of the document on the basis of the elapsed time, it is only required to obtain a product of the sheet conveyance speed (peripheral speed) of the lead roller pair 205 set in advance and the elapsed time.

The lead sensor 206 of the present example is an example of a size acquisition unit that acquires size information regarding the size of the conveyance target sheet. In the present example, the length of the document is used as the size information. In the ADF 2 of the present example, a standard size (for example, the A column or the B column in the range of A6 to A4 and the long side feeding orientation) is specified in advance as the size of the document that can be fed, and is known to the user by means of specifications, a product manual, or the like. This makes it possible to specify the document size upon knowing at least one of the length and the width of the document.

While the document passes on the skimming glass 208, the CIS unit 209 optically scans the reading surface of the document to acquire image information of the reading surface of the document. The document that has passed through the skimming glass 208 reaches the discharge reversing roller pair 210. In a case of the single-sided reading operation, the document is discharged to the discharge tray 211 by the discharge reversing roller pair 210. In a case of the double-sided reading operation, the document from which the image information of the first side has been read is sent to the reverse conveyance path P2 by reverse conveyance (switchback) by the discharge reversing roller pair 210. While the document is conveyed again by the lead roller pair 205 via the skimming glass 208, the CIS unit 209 reads image information from the second side opposite to the first side of the document. Then, the document from which the image information of the first side and the second side has been read is discharged to the discharge tray 211 by the discharge reversing roller pair 210. In the present embodiment, the operation in which the discharge reversing roller pair 210 conveys the document in the discharge direction (first direction) and then conveys the document in the direction (second direction) opposite to the discharge direction is referred to as "reversing operation".

Internal Configuration of Image Reading Apparatus

FIG. 3 is a block diagram showing an internal configuration of the image reading apparatus 1. The image reading apparatus 1 includes a CPU 301 as a controller (program execution portion), storage such as a ROM 302, a RAM 303, and a nonvolatile memory 310, a pulse generator circuit 304, and a reading circuit 312. The image reading apparatus 1 includes a conveyance motor 309, the lead sensor 206 and the document detection sensor 212 described above, and a communication interface (I/F) 311. These elements are connected to one another via a bus 313.

The CPU 301 integrally controls the operation of the entire image reading apparatus 1. For example, the CPU 301 is configured to execute a double-sided reading job and a single-sided reading job in accordance with the control method described below. The ROM 302 stores a firmware program for operating the image reading apparatus 1 and a boot program for controlling the firmware program. The RAM 303 is a work area of the CPU 301 and a temporary storage area of various data. For example, the CPU 301 reads a control program from the ROM 302 to the RAM 303 and executes the control program, thereby implementing the operation of the present example. The nonvolatile memory 310 stores various types of setting information and the like of the image reading apparatus 1. The communication I/F 311 enables communication connection with external apparatuses.

The reading circuit 312 includes the CIS unit 209, an A/D conversion circuit 306, and an image processing unit 307. The reading circuit 312 is configured to convert a signal (luminance signal and reading signal) acquired by optically scanning a document by the CIS unit 209 into digital data, and output the digital data.

The line sensor 305 of the CIS unit 209 includes a plurality of image sensors arrayed in the main scanning direction (sheet width direction). The A/D conversion circuit 306 converts, into digital data (read data and image data), an analog reading signal output from the line sensor 305. The image processing unit 307 includes a shading correction circuit 308. The shading correction circuit 308 performs shading correction in which the read data converted by the A/D conversion circuit 306 is corrected based on a difference in the luminance distribution generated at the time of reading a white reference plate, for example. In a case where the image forming apparatus 100 performs the copying operation, the read data subjected to the shading correction is forwarded to a controller of the image forming apparatus body 101 and used for image formation. The read data may be output to an external apparatus via the communication I/F 311. The image processing unit 307 may include an image processing circuit other than the shading correction circuit 308, for example, a gamma correction circuit.

The pulse generator circuit 304 generates a pulse signal for driving each image sensor of the line sensor 305. The pulse generator circuit 304 is configured to change driving conditions such as the scanning time (hereinafter, referred to as one main scanning time) of one main scanning line of the line sensor 305 by setting from the CPU 301. The conveyance motor 309 drives various rollers such as the lead roller pair 205 that conveys the document.

Restricting Member

Figure 4A:
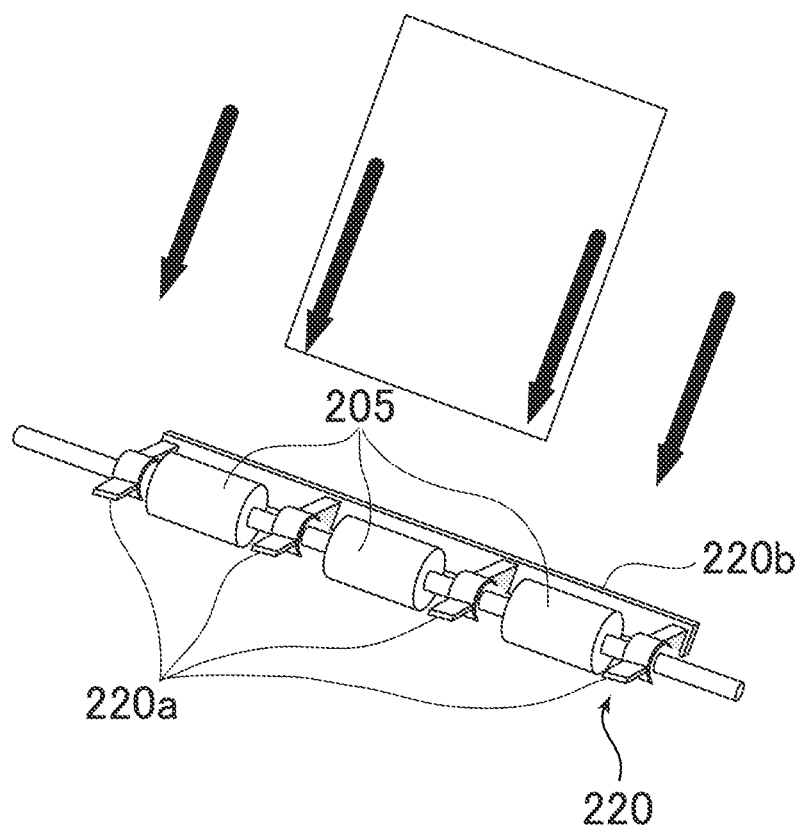
FIGS. 4A and 4B are each a perspective view of a shutter member and a registration roller according to the example.
Figure 4B:
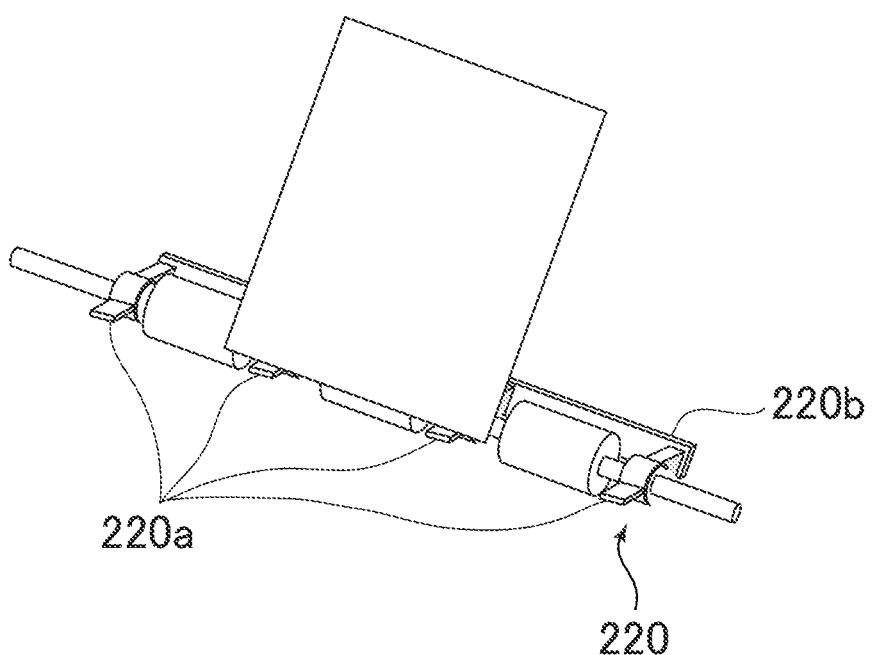
Figure 5A:
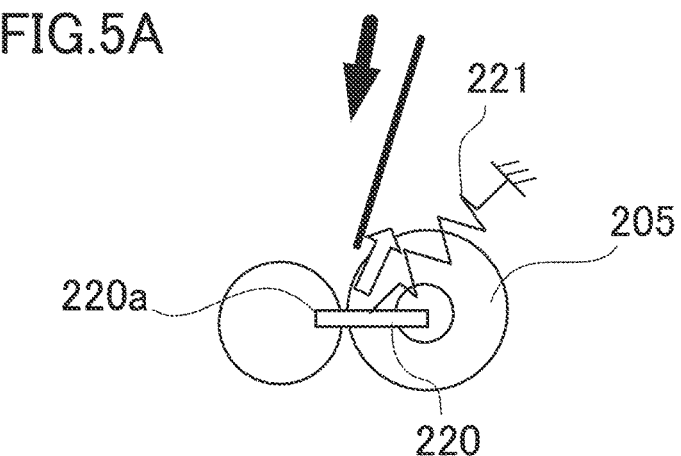
FIGS. 5A to 5D are views showing an operation of the shutter member according to the example.
Figure 5B:
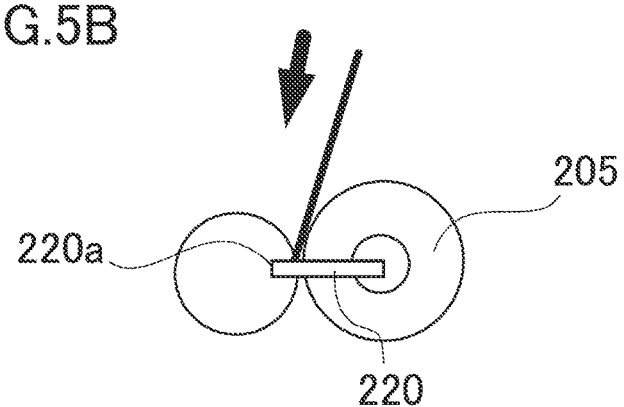
Figure 5C:
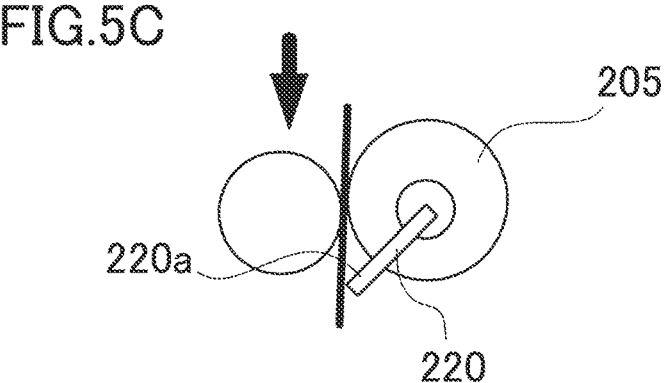
Figure 5D:
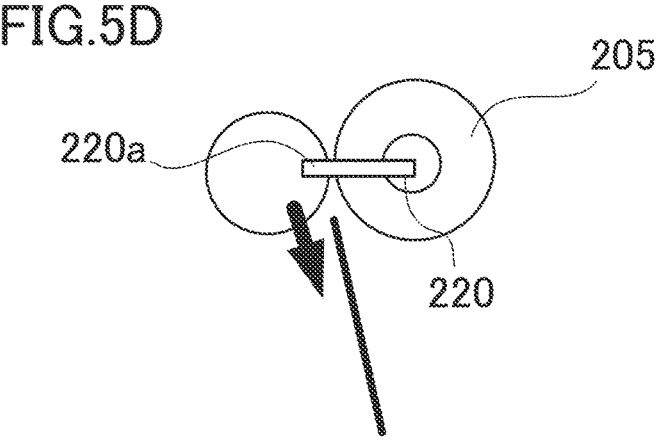

The shutter member 220 as a restricting member that performs skew correction of the document will be described with reference to FIGS. 4A and 4B and 5A to 5D. FIGS. 4A and 4B are perspective views of the shutter member 220 and one roller of the lead roller pair 205 according to the present example. FIG. 4A shows a state before the document comes into contact with the shutter member 220. FIG. 4B shows a state when the document comes into contact with the shutter member 220. FIGS. 5A to 5D are schematic diagrams showing a state when the operation of the shutter member according to the present example is viewed in the sheet width direction. FIG. 5A shows a state before the document comes into contact with the shutter member 220. FIG. 5B shows a state when the document comes into contact with the shutter member 220. FIG. 5C shows a state in which the document is passing through the lead roller pair 205. FIG. 5D shows a state in which the document has passed through the lead roller pair 205 and the shutter member 220 returns to the original position.

As shown in FIG. 4A, the shutter member 220 includes a contact portion 220a that is brought into contact with the leading edge of the document. The shutter member 220 of the present example has a plurality of the (four in the illustrated example) contact portions 220a arranged side by side in the sheet width direction. The plurality of contact portions 220a are coupled via a coupling portion 220b extending in the sheet width direction. Therefore, the plurality of contact portions 220a move integrally.

The shutter member 220 is configured to move to a restricting position (protrusion position) where the contact portion 220a protrudes into the conveyance path to restrict the passage of the document and a retracted position (permitting position) where the contact portion 220a retracts so as to permit the passage of the document. The shutter member 220 in FIGS. 4A, 4B, 5A, 5B, and 5D is positioned at the restricting position, and the shutter member 220 in FIG. 5C is positioned at the retracted position. In a state where the shutter member 220 is positioned at the restricting position, the contact portion 220a is positioned upstream of the nip portion of the lead roller pair 205, and the entry of the document into the nip portion is restricted. The shutter member 220 of the present example is provided so as to be rotatable about the roller shaft of one roller of the lead roller pair 205, but may be configured to rotate about a shaft different from the roller shaft.

As schematically shown in FIG. 5A, the shutter member 220 is urged toward the restricting position by a spring member 221 as an urging member. In a state where the document is not in contact with the shutter member 220, the shutter member 220 is held at the restricting position by the urging force of the spring member 221. When the leading edge of the document comes into contact with the shutter member 220 and the force by which the document presses the shutter member 220 exceeds the urging force of the spring member 221, the shutter member 220 moves from the restricting position to the retracted position against the urging force of the spring member 221. As the spring member 221, for example, a torsion coil spring attached around the roller shaft of the lead roller pair 205 is used. Not limited to this, the shutter member 220 may be urged using a tension spring or a rubber member.

Before the document is conveyed from an upstream conveyance member (the separation roller 203 or the discharge reversing roller pair 210), the shutter member 220 is positioned at the restricting position (FIGS. 4A and 5A). When the document is conveyed from the upstream conveyance member, the leading edge of the document (downstream edge of the document in the sheet conveyance direction at that time point) comes into contact with the contact portion 220a of the shutter member 220 (FIGS. 4B and 5B). At the time point when the leading edge of the document comes into contact with the contact portion 220a, the shutter member 220 remains at the restricting position due to the urging force of the spring member 221.

Even after the leading edge of the document comes into contact with the contact portion 220a, the upstream conveyance member continues conveying the document. At this time, deflection (loop) of the document is generated between the upstream conveyance member and the shutter member 220. In a case where the leading edge of the document is skewed, the leading edge of the document is turned so as to follow the contact portion 220a of the shutter member 220 accompanying the generation of deflection of the document, and the skew of the document is corrected.

As the upstream conveyance member continues conveying the document, the force by which the leading edge of the document presses the contact portion 220a downstream in the sheet conveyance direction increases. Then, when the pressing force that the shutter member 220 receives from the document exceeds the urging force of the spring member 221, the shutter member 220 moves from the restricting position to the retracted position.

When the shutter member 220 moves to the retracted position, the leading edge of the document enters the nip portion of the lead roller pair 205, and is nipped and conveyed by the lead roller pair 205 (FIG. 5C). When the trailing edge of the document has passed through the nip portion of the lead roller pair 205, the shutter member 220 returns to the restricting position by the urging force of the spring member 221 and prepares for the next document.

In the present example, by adjusting the urging force (resilient force) of the spring member 221, the shutter member 220 is configured to automatically retract after the skew correction of the document. Alternatively, the shutter member 220 may be moved using a solenoid, a motor, or another actuator. In this case, the shutter member 220 is only required to be moved from the restricting position to the retracted position at the time point when the amount (loop amount) of the document fed by the upstream conveyance member after the leading edge of the document comes into contact with the shutter member 220 becomes a predetermined value (amount set in advance so that skew correction can be performed).

Conveyance Failure During Double-Sided Conveyance

Next, conveyance failure (paper jam) that may occur in the sheet conveyance operation (double-sided conveyance) of the double-sided reading job will be described. The ADF 2 of the present example is configured to convey documents of a plurality of sizes having different widths.

Here, a document having a small width (hereinafter referred to as small-size document) easily buckles when a small-size document having been reversed abuts against the shutter member 220, compared with a document having a larger width (hereinafter referred to as large-size document), where an example of the small-size is A6 size in the long side feeding orientation, and an example of the large-size is A4 size in the long side feeding orientation. This is because there is not a large difference in magnitude of the load (compression force in the sheet conveyance direction) received when the document abuts on the shutter member 220 between the small-size document and the large-size document, but the cross-sectional area of the document is different between the small-size document and the large-size document depending on the width of the document.

As a specific example, the small-size document shown in FIG. 4A comes into contact with only two of the four contact portions 220a of the shutter member 220. On the other hand, the large-size document can come into contact with all of the four contact portions 220a of the shutter member 220. Assuming that the pressing force necessary for moving the shutter member 220 from the restricting position to the retracted position against the urging force of the spring member 221 is constant, the force that the small-size document receives from one of the contact portions 220a is larger than the force that the large-size document receives from one of the contact portions 220a. Therefore, in the small-size document, out-of-plane deformation (buckling) of the document becomes easy to occur due to concentration of stress near the contact portion 220a, and as a result, a possibility of occurrence of conveyance failure becomes higher than that of the large-size document.

Even in a configuration in which the shutter member 220 is moved by an actuator instead of the spring member 221, stress tends to concentrate on a small-size document as compared with a large-size document due to a difference in contact area with the shutter member 220 and cross-sectional area of the document. This indicates that even in such a configuration, conveyance failure easily occurs in the small-size document as compared with the large-size document during skew correction in the shutter member 220.

Next, a description will be given that conveyance failure becomes easy to occur when skew correction is performed on the reversed document during double-sided conveyance. As described above, the document reversed by the discharge reversing roller pair 210 during double-sided conveyance is conveyed again toward the lead roller pair 205 via the reverse conveyance path P2 (FIG. 2). At that time, the reversed document is abutted against the shutter member 220 and subjected to skew correction.

When the document is reversed by the discharge reversing roller pair 210, there is a variation in the leading edge position (up-down or right-left position in FIG. 2) of the document immediately after reversal. Even in a case where such a variation exists, a space near a branching part P1/2 between the main conveyance path P1 and the reverse conveyance path P2 is often set to be wider than other parts of the conveyance path so that the reversed document enters the reverse conveyance path P2 without flowing back to the main conveyance path P1. In this case, during double-sided conveyance, there is more room for the document to bend in the conveyance path in a state where the document is abutted against the shutter member 220 again after the document is reversed than that in a state where the document is abutted against the shutter member 220 first.

There is a case where the length of the conveyance route from the discharge reversing roller pair 210 to the shutter member 220 via the reverse conveyance path P2 is longer than the length of the conveyance route from the separation roller 203 to the shutter member 220 through the main conveyance path P1. Also in the present example, the former conveyance route length is longer than the latter conveyance route length. Even in such a case, since the distance from the upstream conveyance member that applies a conveyance force during the skew correction to the shutter member 220 is long, the document becomes easy to bend in the range.

Figure 6:
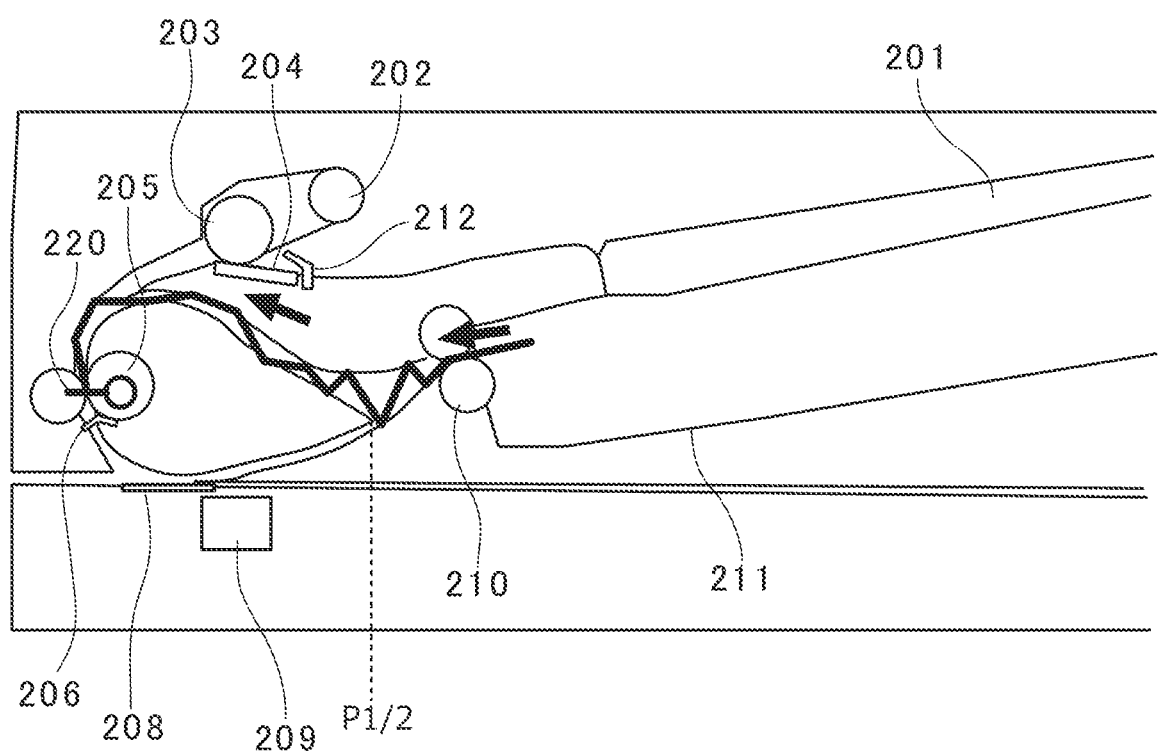
FIG. 6 is a view showing a state in which conveyance failure occurs in the image reading apparatus.

As a result, even if the document does not buckle in the first skew correction during double-sided conveyance of the small-size document, there is a possibility that during the second skew correction, the small-size document largely deflects and buckles near, for example, the branching part P1/2 as shown in FIG. 6, and conveyance failure occurs.

The shape of the conveyance path in the present example will be described in detail. As described above, the space near the branching part P1/2 between the main conveyance path P1 and the reverse conveyance path P2 is set to be wider than other parts of the conveyance path so that the reversed document enters the reverse conveyance path P2 without flowing back to the main conveyance path P1. Specifically, the maximum value of the width of the conveyance path in the conveyance route from the discharge reversing roller pair 210 to the shutter member 220 via the reverse conveyance path P2 is larger than the maximum value of the width of the conveyance path in the conveyance route from the separation roller 203 to the shutter member 220 through the main conveyance path P1. Here, the width of the conveyance path is an interval between guide surfaces opposing each other forming the conveyance path. The width of the reverse conveyance path P2 is maximized at the branching part P1/2 (boundary between the downstream end of an upper surface guide 223 of the main conveyance path P1 and the upstream end of a lower surface guide 224 of the reverse conveyance path P2 as shown in FIG. 2).

The reverse conveyance path P2 of the present example is inclined upward toward the downstream side (left side in the FIG. 2) in the sheet conveyance direction. The lower surface guide 224 of the reverse conveyance path P2 extends upward from the branching part P1/2 toward the side opposite to the discharge reversing roller pair 210 with respect to the horizontal direction. The upstream end (right end in the FIG. 2) of the lower surface guide 224 is positioned below a nip line Ld (tangent line of each roller passing through the nip portion) of the discharge reversing roller pair 210 as shown in FIG. 2. Here, when the upper surface guide 225 positioned above the branching part P1/2 protrudes downward, there is a possibility that the reversed document flows back to the main conveyance path P1. Therefore, the upper surface guide 225 is disposed at a position separated upward from the nip line Ld of the discharge reversing roller pair 210, for example.

Such configuration makes it possible to reduce the possibility that the reversed document flows back to the main conveyance path P1 without disposing a flap-shaped guide for preventing back flow to the main conveyance path P1 in the branching part P1/2. In the present example, cost reduction is possible by not using the flap-shaped guide, but a flap-shaped guide may be added to more reliably restrict the back flow.

Control Example

Figure 7:
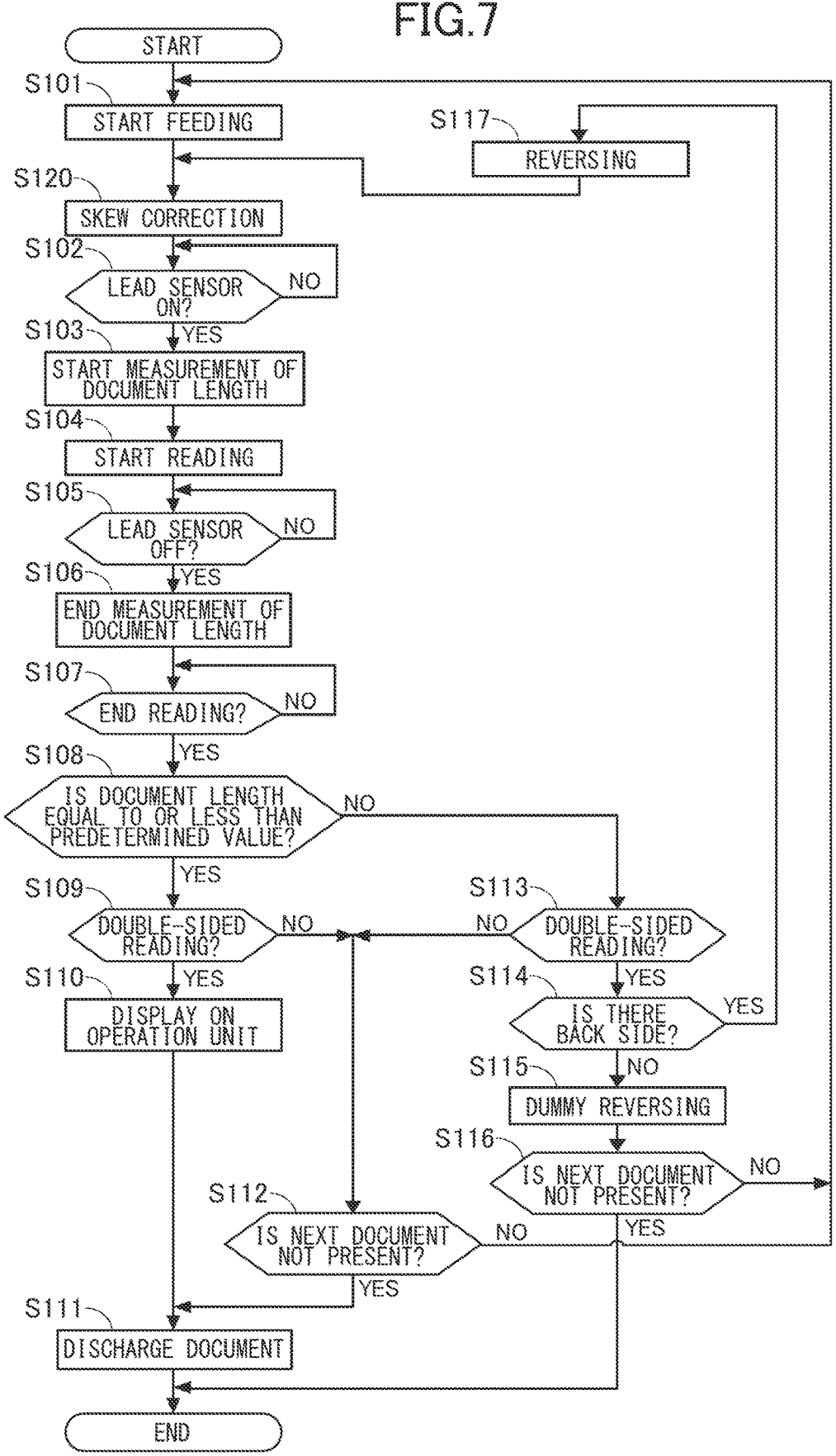
FIG. 7 is a flowchart showing a control method of the image reading apparatus according to the example.

In order to reduce conveyance failure during double-sided conveyance, in the present example, even in a case of receiving an execution instruction of a double-sided reading job, which is an example of a double-sided conveyance job, the document can be discharged without being subject to the reversing operation by the discharge reversing roller pair 210 depending on the size information of the document. Hereinafter, a control method of the reading job according to the present example will be described with reference to the flowchart of FIG. 7. Unless otherwise specified, the entire processing in this flowchart can be implemented by the CPU 301 calling and executing a control program stored in the ROM 302.

When the user places a document onto the document tray 201 and presses a scan start button of the operation unit 3, the CPU 301 starts execution of the job. When the execution of the job is started, feeding and separation conveyance of the document are started by rotational driving of the pickup roller 202 and the separation roller 203 and lowering operation of the pickup roller 202 (S101).

The document having been fed is abutted against the shutter member 220 and subjected to skew correction (S120). In the present example, since the shutter member 220 is configured to automatically retract, the rotational driving of the separation roller 203 is continued as the actual processing in S120. After the skew correction, when the shutter member 220 moves from the restricting position to the retracted position, the document passes through the nip portion of the lead roller pair 205.

The CPU 301 waits until it detects a document detection signal (ON) of the lead sensor 206, that is, a signal indicating that the lead sensor 206 has detected the leading edge of the document (S102). Upon detecting the document detection signal of the lead sensor 206, the CPU 301 starts measuring the document length (S103).

On the basis of the document detection signal of the lead sensor 206, the CPU 301 generates an image leading signal for specifying a timing at which the leading edge of the document reaches a position (reading position) where the leading edge of the document is conveyed by a predetermined distance from the detection position of the lead sensor 206. On the basis of this image leading signal, scanning of the document by the CIS unit 209 is started, and read data of the document is acquired (S104).

Thereafter, the CPU 301 determines whether or not it has detected a document absence detection signal (OFF) of the lead sensor 206, that is, a signal indicating that the lead sensor 206 has detected the trailing edge of the document (S105). Upon detecting the document absence detection signal of the lead sensor 206, the CPU 301 ends the measurement of the document length (S106). The CPU 301 ends the reading by the CIS unit 209 at the timing when the trailing edge of the document reaches a position (reading position) conveyed by a predetermined distance from the detection position of the lead sensor 206 (S107).

In the present example, the subsequent processing is branched on the basis of the measured document length. That is, after the reading of the document ends (S107), the CPU 301 performs determination processing on the basis of the measurement result of the document length (S108).

If the document length is equal to or less than a predetermined length (threshold length) set in advance, the CPU 301 determines whether the job in execution is a double-sided reading job or a single-sided reading job. If the job in execution is a double-sided reading job, the CPU 301 stops continuation of the reading operation. The continuation of the reading operation is stopped because there is a possibility that conveyance failure occurs during the second skew correction of the document during double-sided conveyance of the small-size document for the reason described above. Then, the CPU 301 causes a predetermined operation unit 3 to perform display as notification processing of notifying that execution of the double-sided reading job is impossible (S110). The CPU 301 causes the discharge reversing roller pair 210 to discharge the document onto the discharge tray 211 without performing the reversing operation by the discharge reversing roller pair 210 (S111).

In the present example, in a double-sided reading job targeting a plurality of documents, the document length of each of the documents is measured (S102 to S106), and it is determined whether to or not to continue double-sided conveyance on the basis of the measured document length (S108 and S109). This makes it possible to reduce the possibility that conveyance failure occurs during conveyance of a small-size document, even in a case where, for example, the user does not know the specifications or erroneously places mixed documents of a plurality of sizes including a small-size document onto the document tray 201.

Figure 8:
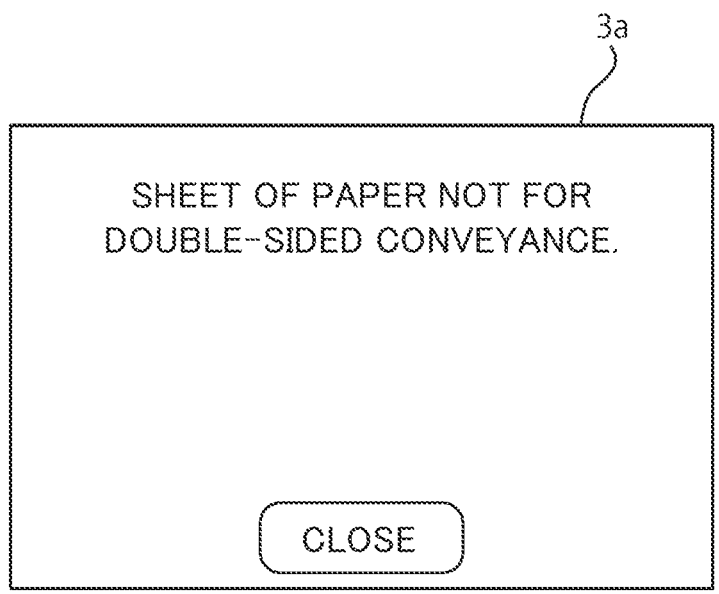
FIG. 8 is an example of a screen displayed on an operation display unit when conveyance failure occurs in the example.

FIG. 8 is an example of an image displayed on the screen 3a of the operation unit 3 in S110. Here, a message notifying the user that the document (sheet) set in the document tray 201 is not suitable for double-sided conveyance is displayed. The method of notification to the user (content of the notification processing) is not limited to this, and for example, the impossibility of double-sided conveyance failure may be notified by voice.

If the document length is not equal to or less than the predetermined length in S108, the CPU 301 determines whether the job in execution is a double-sided reading job or a single-sided reading job. If the job in execution is a double-sided reading job, the CPU 301 continues the reading operation (S114 to S117).

Specifically, the CPU 301 determines whether the image read this time is an image on the front side (first side) of the document. If the image read this time is an image on the front side of the document (S114: NO), the CPU 301 causes reversing of the document by the discharge reversing roller pair 210 (S117). The reversed document is subjected to skew correction (S120) again by the shutter member 220. At this time, since the document length is already known to be larger than the predetermined length and the document is not a small-size document, there is a low possibility that conveyance failure occurs during the second skew correction. Thereafter, an image on the back side (second side) of the document is read by processing similar to that at the time of reading the first side (S102 to S108).

On the other hand, if the image read this time is an image on the back side (second side) of the document (S114: YES), the CPU 301 causes reversing of the document by the discharge reversing roller pair 210 and causes the document to make another round on the reverse conveyance path P2 and the main conveyance path P1 (S115). At this time, the image is not read. Reversing and conveying the document by the discharge reversing roller pair 210 in order to make an extra round in the ADF 2 before discharging the document without reading the image can be called dummy reversing. By performing the dummy reversing, it is possible to match orientations (i.e., front-side up or back-side up) of the documents in the discharge tray 211 between the double-sided reading job and the single-sided reading job. However, the document may be discharged without performing the dummy reversing with priority given to productivity.

Thereafter, the CPU 301 determines whether a next document is present on the document tray 201 (S116). If the next document is present, the process returns to S101 to continue the execution of the job, and if the next document is not present, the job ends.

Processing in the case of the single-sided reading job will be described. If the CPU 301 determines that the job in execution is a single-sided reading job in S109 or S113, the CPU 301 determines whether a next document is present on the document tray 201 (S116). If the next document is present, the process returns to S101 to continue the execution of the job, and if the next document is not present, the job ends.

As described above, in the case of the single-sided reading job, the execution of the job is continued regardless of whether or not the document length is equal to or less than a predetermined value. This is because even in a small-size document, conveyance failure of the document is less likely to occur during single-sided conveyance than during double-sided conveyance.

As described above, in a case of receiving an execution instruction of a double-sided reading job, when the size information of the document is equal to or smaller than a predetermined size, the document passes through the shutter member 220 first, and then is discharged to the discharge reversing roller pair 210 without being reversed (S108, S109, and S111). In other words, in the present example, the CPU 301 permits the reversing operation if the CPU 301 receives an execution instruction of the double-sided reading job on a document having a first size larger than the predetermined size, and prohibits the reversing operation if the CPU 301 receives an execution instruction of the double-sided reading job on a sheet having a second size smaller than the predetermined size.

This makes it possible to reduce the possibility that conveyance failure occurs during the second skew correction of the document during double-sided conveyance of a small-size document.

Operation of Single-Sided Reading Job

The operation when the image reading apparatus 1 executes a reading job in accordance with the above-described control method will be described. First, a case of a single-sided reading job will be described with reference to FIGS. 9A to 9F.

FIGS. 9A to 9F show an operation when two documents are set in the document tray 201 and execution of a single-sided reading job is instructed. In the following description, regarding the detection signal of the lead sensor 206 or the document detection sensor 212, let a signal indicating that each sensor detects the document be ON, and a signal indicating that no document is detected be OFF.

Figure 9A:
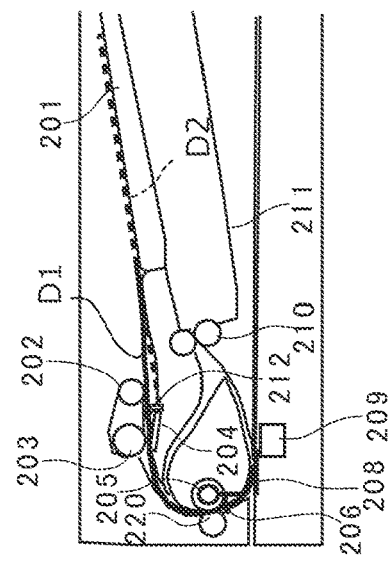
FIGS. 9A to 9F are views showing a single-sided reading operation by the image reading apparatus according to the example.

FIG. 9A shows a state in which two documents D1 and D2 are set in the document tray 201. In the figure, the solid line indicates the first document D1, and the broken line indicates the second document D2. The CPU 301 detects the setting of the document on the basis of an event that the document detection sensor 212 is switched from OFF to ON. Upon detecting the setting of the document, the CPU 301 performs initialization control of the ADF 2 to prepare for the start of the reading job.

Figure 9B:
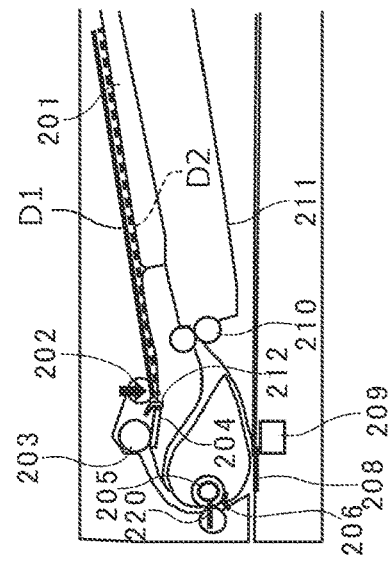

FIG. 9B shows a state when the user instructs execution of the single-sided reading job, the conveyance motor 309 is activated, and feeding and separation conveyance of the first document D1 are started (S101). The driving speed of the conveyance motor 309 is determined according to the setting of the reading job, for example, according to a combination of a color mode (color or black and white) and resolution (main scanning direction and sub-scanning direction). Even if the setting of the reading job is changed, the content of the conveyance operation by the ADF 2 is common. Thereafter, the document D1 is conveyed via the separation nip, subjected to the first skew correction (S120) in the shutter member 220, and then nipped by the lead roller pair 205 to be further conveyed. When the leading edge of the document reaches the detection position of the lead sensor 206, the lead sensor 206 becomes ON, and the measurement of the document length is started (S103).

Figure 9C:
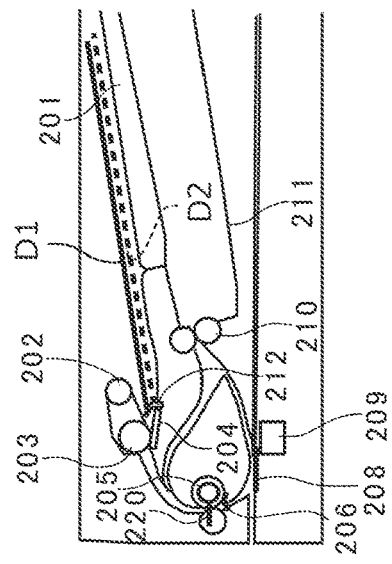

FIG. 9C shows a state when the lead sensor 206 becomes ON and the leading edge of the document D1 is positioned at a temporary stopping position upstream of the reading position. In a case where the reading on the body unit 1A side is not prepared at the timing when the lead sensor 206 becomes ON, the CPU 301 is configured to temporarily stop the conveyance of the document D1. In this case, the stop period is not counted in the measurement of the document length. The CPU 301 outputs the image leading signal as a trigger for starting the reading by the CIS unit 209 at a timing when the conveyance of the document D1 is continued or restarted after the document D1 is temporarily stopped, and the leading edge of the document D1 reaches the reading position (S104).

Figure 9D:
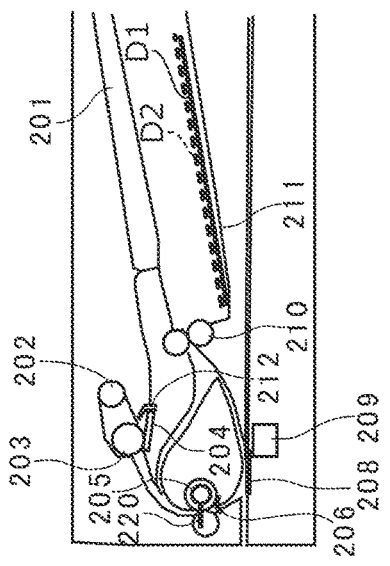

FIG. 9D shows a state in which the first document D1 is being discharged by the discharge reversing roller pair 210. In the case of the single-sided reading job, the document D1 is discharged as it is without being reversed. When the trailing edge of the first document D1 has passed through the pickup roller 202, it becomes possible to start feeding of the second document D2. The CPU 301 is configured to determine whether or not a next document is present in the document tray 201 by conforming a signal of the document detection sensor 212 at the time point when the lead sensor 206 becomes OFF, for example, due to the trailing edge of the document D2 having passed through the lead sensor 206. Here, since the next document D2 exists, feeding and separation conveyance of the second document D2 are started (S112: NO→S101).

Here, the conveyance speed (peripheral speed) of each roller is set to become faster from the upstream toward the downstream in the sheet conveyance direction on the main conveyance path P1. That is, the peripheral speed of the separation roller 203 is faster than the conveyance speed of the pickup roller 202, the peripheral speed of the lead roller pair 205 is faster than the peripheral speed of the separation roller 203, and the peripheral speed of the discharge reversing roller pair 210 is faster than the peripheral speed of the lead roller pair 205. Therefore, a gap between sheets is secured between the documents D1 and D2, and conveyance can be performed without the leading edge of the second document D2 colliding with the trailing edge of the first document D1.

Figure 9E:
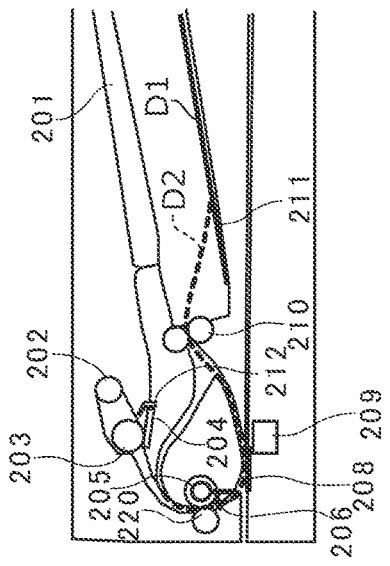

FIG. 9E shows a state after the trailing edge of the second document D2 having passed through the document detection sensor 212. The CPU 301 is configured to determine whether or not a next document is present in the document tray 201 by conforming a signal of the document detection sensor 212 at the time point when the lead sensor 206 becomes OFF, for example, due to the trailing edge of the document D2 having passed through the lead sensor 206. Here, since the next document does not exist on the document tray 201, the document detection sensor 212 is OFF. Therefore, feeding by the pickup roller 202 is not performed.

Figure 9F:
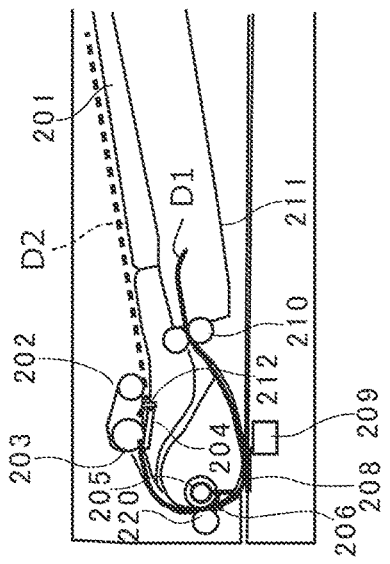

FIG. 9F shows a state after the second document D2 (final document) is discharged to the discharge tray 211. If it is determined that the document D2 is the final document (S112: YES), conveyance is continued for a predetermined distance having been set such that the trailing edge of the document D2 passes through the discharge reversing roller pair 210 based on the time point when the trailing edge of the document D2 having passed through the lead sensor 206 (S111). At this time, the discharge reversing roller pair 210 is excessively rotated by several tens of mm so that the trailing edge of the document D2 does not lean against the discharge reversing roller pair 210. After the discharge processing ends, the pickup roller 202 is raised to enable reception of the next job.

Operation of Double-Sided Reading Job

Next, the double-sided reading job will be described with reference to FIGS. 10A to 10F. Parts common to the single-sided reading job will be omitted, and parts different from the single-sided reading job will be mainly described.

FIG. 10F shows a state when the first document D1 reaches the temporary stopping position. The CPU 301 stops the conveyance motor 309 at the timing when the lead sensor 206 becomes ON, and reversely rotates the conveyance motor 309 after a stop stabilization time of a predetermined time. When the conveyance motor 309 is reversely rotated, each conveyance roller continues forward rotation, but the pickup roller 202 can be raised. This makes it possible to prevent the next document D2 from being fed following the previous document D1. After the conveyance motor 309 is reversely rotated by a predetermined pulse, the conveyance motor 309 is stopped again, and after a predetermined stop stabilization time, the conveyance of the document D1 is restarted by rotating the conveyance motor forward, and image reading is started (S104).

FIG. 10B shows a state when the document D1 reaches a reversing position of the discharge reversing roller pair 210. The reversing position is a position before the trailing edge of the document D1 on the main conveyance path P1 passes through the branching part P1/2 and reaches the discharge reversing roller pair 210. The CPU 301 determines whether the document D1 reaches the reversing position on the basis of the conveyance distance of the document D1 after the lead sensor 206 becomes OFF in accordance with the passage of the trailing edge of the document D1. Upon determining that the document D1 has reached the reversing position, the CPU 301 stops the conveyance motor 309 and then reversely rotates the conveyance motor 309 (S117).

If the document length measured using the lead sensor 206 is equal to or less than the predetermined length (S108: YES), even if the document D1 reaches the reversing position of the discharge reversing roller pair 210, the discharge reversing roller pair 210 is not reversed, and the document D1 is discharged (S111). In this case, the read data on the front side of the document D1 is discarded. The next document D2 is not fed.

FIG. 10C shows a state in which the document D1 is conveyed to the reverse conveyance path P2 by the reverse rotation of the conveyance motor 309 and abuts on the shutter member 220, thereby performing the second skew correction. After the skew correction, when the lead sensor 206 becomes ON, the CPU 301 temporarily stops the conveyance motor 309. Thereafter, as soon as the reading preparation on the body unit 1A side ends, the CPU 301 restarts the conveyance of the document D1 and causes the image on the back side to be read. After a predetermined time from the restart of conveyance of the document D1, pressurization of the discharge reversing roller pair 210 is released and the conveyance is continued.

FIG. 10D shows a state in which the document D1 reaches again the discharge reversing roller pair 210. After the reading of the image from the back side of the document D1 ends, the CPU 301 performs reverse conveyance (dummy reversing) of the document D1 again by the discharge reversing roller pair 210 (S115).

FIG. 10E shows a state in which feeding of the next document D2 is started before discharge of the previous document D1 is completed in a case where there is the next document D2 in order to improve the productivity of the double-sided reading job. Specifically, the CPU 301 decelerates the conveyance motor 309 at a time point when the document D1 is conveyed by a predetermined distance after the lead sensor 206 becomes OFF during the dummy reversing of the document D1, and lowers the pickup roller 202 when the conveyance motor 309 stops. Accordingly, feeding of the next document D2 is started (S116: NO→S101). Thereafter, conveyance of the second document D2 and reading of the images of the front side and the back side are performed by the same operation as that of the first document D1.

FIG. 10F shows a state when the discharge of the document D2 (final document) is completed. In the single-sided reading job, the processing of raising the pickup roller 202 is performed at the end of the job, but in the case of the double-sided reading job, the pickup roller 202 has already risen, and thus the raising process becomes unnecessary.

Modification 1

In the above-described example, in a case where the document length is equal to or less than the predetermined length when a double-sided reading job is received, the execution of the double-sided reading job is stopped, and the read data on the front side having already been read is discarded. Alternatively, in a case where the execution of the double-sided reading job is stopped, the copying operation of only one side may be executed on the basis of the read data of the front side having already been read, or the read data on the front side may be transmitted to an external apparatus.

Modification 2

In the above-described example, the configuration using the lead sensor 206 has been exemplified as an example of the size acquisition unit that acquires the size information regarding the size of the sheet. The size acquisition unit is not limited to this. For example, read data read by the CIS unit 209 may be subjected to image processing (edge detection) to detect the outline (edge) of the document, and the size (length and width) of the document may be estimated on the basis of the size of the detected outline, the document conveyance speed during reading, and the like. In this case, the CIS unit 209 serves as both a reading sensor for image information and a size acquisition unit for size information. The CPU 301 is configured to also perform the above-described control on the basis of the document size explicitly input by the user via the operation unit 3 as another example of the size acquisition unit.

As still another example of the size acquisition unit, the conveyance path of the document may be provided with a detection sensor that detects the document at a plurality of positions in the sheet width direction. As the detection sensor, for example, a plurality of flags arranged side by side in the sheet width direction and a photo interrupter that detects swing of each flag can be used. As still another example of the size acquisition unit, the ADF 2 may be configured to include a sheet width sensor that detects the position of the side edge regulation member 201S (FIG. 2). As the sheet width sensor, it is possible to use a volume sensor attached to a pinion of a rack and pinion mechanism coupling a pair of regulation plates, for example. As described above, at least one of the length and the width of the document can be used as the size information.

Modification 3

In the above-described example, it is assumed that the documents placed on the document tray 201 have the same size, and it is not assumed that documents of a plurality of sizes are mixed. However, the present technology may be applied to the ADF 2 including a normal mode in which documents of uniform sizes are conveyed and a mixed mode in which documents of a plurality of sizes can be mixed. The mixed mode is a mode in which, when the user instructs execution of a reading job in a state where documents of a plurality of sizes are collectively set on the document tray 201, the documents are continuously fed one by one regardless of the difference in size, and images are read.

In the case of the mixed mode, even if the document tray 201 is provided with the sheet width sensor, for example, the position of the side edge regulation member 201S and the actual document size sometimes do not match. Therefore, by acquiring the size information of the document using the size acquisition unit provided on the conveyance path as the lead sensor 206 described in the above-described example, it is possible to accurately determine whether or not double-sided conveyance is possible for each document. This makes it possible to reduce occurrence of conveyance failure in a case of performing double-sided conveyance of a small-size document in the mixed mode.

On the other hand, in the case of the normal mode, when, by the detection result of the sheet width sensor or the user input via the operation unit 3, the document size is determined before the start of execution of the job and the document is a small-size document, the double-sided reading job needs not be accepted.

Modification 4

It has been found that even if the document size is the same, if a thin sheet of paper or the like having a small grammage is used as a document, conveyance failure during double-sided conveyance is more likely to occur. Therefore, for example, if the grammage of the document is known in advance, at the time of a small-size document and double-sided conveyance, the double-sided conveyance may be stopped when the grammage is equal to or less than a predetermined value (S108, S109, and S111), and the double-sided conveyance may be continued when the grammage is larger than the predetermined value.

Other Modifications

In the above-described example, the ADF 2 of the image reading apparatus 1 constituting a part of the image forming apparatus 100 has been exemplified as an example of the sheet conveyance apparatus. The present technology is not limited to this, and can also be applied to an ADF of an image reading apparatus used independently of an image forming apparatus, or a sheet conveyance apparatus that conveys a sheet other than a document. For example, the present technology can be applied to a sheet conveyance apparatus that conveys a sheet as a recording material in an inkjet printer configured to perform double-sided printing.

According to the present disclosure, it is possible to reduce the possibility of occurrence of conveyance failure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-035263, filed on Mar. 8, 2022, which is hereby incorporated by reference herein in its entirety.

What is claimed is:

1. An image reading apparatus comprising:
a stacking tray on which a sheet is stacked;
a feeding roller configured to feed the sheet stacked on the stacking tray;
a restricting member configured to move to a restricting position where the restricting member restricts passage of the sheet and a retracted position where the restricting member is retracted to permit passage of the sheet, the restricting member being configured to correct skew of the sheet by coming into contact with a leading edge of the sheet fed by the feeding roller at the restricting position, and to move from the restricting position to the retracted position by being pressed by the sheet;
a reading sensor configured to read, at a reading position, an image of the sheet that has passed through the restricting member;
a reversing roller configured to perform a reversing operation of conveying, in a first direction, the sheet that has passed through the reading position, and then conveying the sheet in a second direction opposite to the first direction;
a first conveyance path through which the sheet is conveyed from the feeding roller to the reversing roller via the restricting member and the reading position;
a second conveyance path through which the sheet reversed by the reversing roller is conveyed from the reversing roller toward the restricting member; and
a controller configured to execute a double-sided reading job of conveying the sheet to the reading position via the first conveyance path to read an image of a first side of the sheet, and conveying the sheet again to the reading position via the second conveyance path by the reversing operation to read an image of a second side opposite to the first side of the sheet,
wherein the controller is configured to permit the reversing operation in a case where the controller receives an execution instruction of the double-sided reading job on a sheet having a first size, and prohibit the reversing operation in a case where the controller receives an execution instruction of the double-sided reading job on a sheet having a second size smaller than the first size.

2. The image reading apparatus according to claim 1, wherein the controller is configured to execute notification processing of notifying a user that execution of the double-sided reading job is impossible in a case where the controller receives the execution instruction of the double-sided reading job on the sheet having the second size.

3. The image reading apparatus according to claim 2 further comprising:
a display configured to display information,
wherein in the notification processing, the controller is configured to cause the display to display a message indicating that execution of the double-sided reading job is impossible.

4. The image reading apparatus according to claim 1 further comprising:
a detection sensor configured to detect the sheet at a detection position on the first conveyance path,
wherein the controller is configured to acquire size information of the sheet based on an elapsed time from when the detection sensor detects the leading edge of the sheet to when the detection sensor detects a trailing edge of the sheet.

5. The image reading apparatus according to claim 1 further comprising:
an operation unit configured to receive an input operation of inputting information regarding a size of the sheet to the image reading apparatus.

6. The image reading apparatus according to claim 1 further comprising:
a side edge regulation member configured to regulate an edge position in a sheet width direction of the sheet stacked on the stacking tray; and
a sheet width sensor configured to detect a position of the side edge regulation member,
wherein the controller is configured to acquire size information of the sheet based on a detection result of the sheet width sensor.

7. The image reading apparatus according to claim 1 further comprising:
an urging member configured to urge the restricting member toward the restricting position,
wherein the restricting member is configured to move from the restricting position to the retracted position in a case where a force received from the sheet exceeds an urging force of the urging member.

8. The image reading apparatus according to claim 1, wherein the restricting member includes a plurality of contact portions that are configured to come into contact with the sheet at positions different from one another in a sheet width direction, and
wherein the sheet having the second size is a sheet that comes into contact with only some contact portions of the plurality of contact portions.

9. The image reading apparatus according to claim 1, wherein a maximum value of a width of a conveyance path in a conveyance route from the reversing roller to the restricting member via the second conveyance path is larger than a maximum value of a width of the first conveyance path from the feeding roller to the restricting member.

10. The image reading apparatus according to claim 1, wherein the second conveyance path includes a lower surface guide and an upper surface guide,
wherein when viewed in a sheet width direction, the lower surface guide extends, from a branching part at which the first conveyance path and the second conveyance path branches, upward toward a side opposite to the reversing roller with respect to a horizontal direction, and an upstream end of the lower surface guide is positioned below a nip line of the reversing roller, and
wherein when viewed in the sheet width direction, the upper surface guide is positioned above the branching part and is separated upward from the nip line.

11. The image reading apparatus according to claim 1 further comprising:
a discharge tray to which the sheet is discharged,
wherein the reversing roller is a discharge roller configured to discharge the sheet to the discharge tray.

12. The image reading apparatus according to claim 11, wherein in a case where the controller receives the execution instruction of the double-sided reading job on the sheet having the second size, the controller is configured to cause, after the image of the first side is read, the sheet to be discharged to the discharge tray without being subject to the reversing operation.

13. The image reading apparatus according to claim 1, wherein the controller is configured to
execute a single-sided reading job of reading image information from only one side of the sheet,
discard image information read from the first side of the sheet in a case where the controller receives the execution instruction of the double-sided reading job on the sheet having the second size, and
keep image information read from the first side of the sheet in a case where the controller receives an execution instruction of the single-sided reading job on the sheet having the second size.

14. An image forming apparatus comprising:
a stacking tray on which a sheet is stacked;
a feeding roller configured to feed the sheet stacked on the stacking tray;
a restricting member configured to move to a restricting position where the restricting member restricts passage of the sheet and a retracted position where the restricting member is retracted to permit passage of the sheet, the restricting member being configured to correct skew of the sheet by coming into contact with a leading edge of the sheet fed by the feeding roller at the restricting position, and to move from the restricting position to the retracted position by being pressed by the sheet;
a reading sensor configured to read, at a reading position, an image of the sheet that has passed through the restricting member;
a reversing roller configured to perform a reversing operation of conveying, in a first direction, the sheet that has passed through the reading position, and then conveying the sheet in a second direction opposite to the first direction;
a first conveyance path through which the sheet is conveyed from the feeding roller to the reversing roller via the restricting member and the reading position;
a second conveyance path through which the sheet reversed by the reversing roller is conveyed from the reversing roller toward the restricting member;
a controller configured to execute a double-sided reading job of conveying the sheet to the reading position via the first conveyance path to read an image of a first side of the sheet, and conveying the sheet again to the reading position via the second conveyance path by the reversing operation to read an image of a second side opposite to the first side of the sheet; and
an image forming portion configured to form an image on a recording material based on image information read by the image reading apparatus,
wherein the controller is configured to permit the reversing operation in a case where the controller receives an execution instruction of the double-sided reading job on a sheet having a first size, and prohibit the reversing operation in a case where the controller receives an execution instruction of the double-sided reading job on a sheet having a second size smaller than the first size.

* * * * *